2,847,396
GUANYLUREA RESINS AND PROCESS FOR PRODUCING THEM

Lucien Sellet, Saddle River, N. J.
No Drawing. Application August 5, 1953
Serial No. 372,603
20 Claims. (Cl. 260—70)

The present invention relates to novel guanylurea resins and to the novel process for producing them, said resins having particular importance in the tanning industry.

Objects and advantages of the invention will be set forth in part hereinafter and in part will be obvious herefrom, or may be learned by practice with the invention, the same being realized and attained by means of the steps, compositions and processes pointed out in the appended claims.

The invention consists in the novel steps, processes, compositions, combinations and improvements herein shown and described.

An object of my invention is to provide novel cation-active resins, cation-active resinous complexes modified with anion-active radicals and resinous compositions comprising cation-active resins in combination with high molecular weight sulfo complexes, having a high affinity for solid materials colloidal in nature such as raw animal hides.

Another object of my invention is to provide novel cation-active resins, cation-active resinous complexes modified with anion-active radicals and resinous compositions comprising cation-active resins in combination with high molecular weight sulfo complexes, which are suitable as pretanning, direct tanning, retanning and bleaching agents for the tanning industry.

A still further object of my invention is to provide novel cation-active resins, cation active resinous complexes modified with anion-active radicals and resinous compositions comprising cation-active resins in combination with high molecular weight sulfo complexes, which are stable in water solutions and which impart to a treated hide, a high shrink temperature as well as imparting a fullness to the hide.

In producing the resins of the present invention, a stage A resinous product is first produced by reacting a stable acid salt of guanylurea with formaldehyde or a formaldehyde-liberating material to produce a cation-active resinous product, hereinafter referred to as the "stage A resin." In producing this stage A resin, the reactants are continuously stirred during the reaction in the presence of water as a diluent. The reaction time is generally in the range of 3 to 5 hours, preferably 4, at a temperature in the general range of 60° to 100° C., preferably 95° C. Lower temperatures may be employed if so desired but are not preferred due to the increased time of reaction. The amount of formaldehyde used in the stage A reaction, based on the amount of guanylurea, is generally in the range of 1.5 to 6.0 moles, preferably 4 moles, of formaldehyde per mole of guanylurea. If so desired an excess of formaldehyde may be employed than that disclosed in the above range, thus providing formaldehyde for use in tanning. The excess formaldehyde may form hydroxy polyethers or aldols which later break down into formaldehyde. The water present as a diluent is generally in the range of ½ to 4 times the amount of guanylurea present.

By using the above described stage A resin as the key intermediate reactant, highly useful tanning agents may be produced in accordance with various modifications of the present invention.

In one modification of my invention, the stage A resin is condensed with an amine having a reactive hydrogen atom such as urea, guanylurea, guanidine, dicyanodiamide, guanyl thiourea, melamine, ammeline, ammelide and diacetylene urea at elevated temperatures in the range of 50° C. to 100° C., preferably 95° to 100° C., for 3 to 5 hours; preferably 4 hours, the amount of the amino compound being in the range of ⅓ to 1 mole per mole of guanylurea used in forming the stage A reaction product. This reaction is carried out in the presence of water as a diluent, either by means of water carried over from the stage A reaction or by the addition of water, the water being in the range of ½ to 4 times the weight of the guanylurea in the stage A resin. The product produced by this reaction will hereinafter be referred to as "amino modified stage A resin."

If so desired, in forming the modified stage A resin, formaldehyde may be included as a reactant to produce products of higher solubility and with greater number of reactive methylol groups. The amount of complementary formaldehyde is generally in the range of 1½ to 4 moles per mole of guanylurea used in forming the stage A resin. The stage A resins and amino modified stage A resins of the present invention are generally acidic in character as the guanylurea reactant employed in producing these resins is in the form of stable acid salts. Salts of weak acids such as guanylurea borate, however, produce resins which are substantially neutral.

In another aspect of my invention the stage A resin or the amino modified stage A resin may be caused to interact with a metal salt of mineral or organic acids to form what will hereinafter be called guanylurea resinous metallic complexes. Basic aluminum salts of organic acids are particularly appropriate for forming the guanylurea complexes of the present invention to produce white tonnages of absolute light resistance and high shrink temperature.

The amount of metal salt, based on the amount of guanylurea used in producing the resin of stage A, is in the range of ¼ to 1½ moles, preferably 1 to 1½ moles per mole to guanylurea. If so desired, an excess of the heavy metal salt may be employed, said excess salt imparting its known tanning effect. The reaction is carried out in the presence of water as a diluent, the water being generally ½ to 4 times the amount of guanylurea used in forming the stage A resin.

Examples of suitable metal salts which may be used in accordance with the present invention are basic aluminum acetate, an aluminum acetate having the formula $Al(OH)_2(CH_3COO) \cdot \frac{1}{3}H_3BO_3$ aluminum formo acetate having the formula $Al(OH)(OOCH)(OOCCH_3)$, aluminum formate, basic chrome sulfate, chrome sulfate, chrome alum $(Cr_2(SO_4)_3K_2SO_4 \cdot 12H_{20})$, zirconium sulfate, basic zirconium sulfate, zirconium chloride, basic zirconium chloride, zirconium acetate, copper acetate, copper sulfate, copper chloride, iron formate, iron sulfate, iron gluconate, iron chloride, zinc acetate, zinc chloride and zinc formate.

The reaction of the metal salt with the resin is carried out at a temperature generally in the range of room temperature to 100° C., for a period of time in the range of ½ to 4 hours.

In another aspect of my invention, prior to forming the guanylurea metallic complex, the stage A resin or amino modified stage A resin is reacted with a sulfo compound in order to introduce at least one sulfo group to said resin so that in forming the metallic complexes the metal salts can form metal derivatives of two functional groups, namely, the methylol and sulfo groups whereby the guanylurea metallic complexes so formed act as vehicles in carrying the metal into the hide substance when treated with said complex. Although the chemical or physico-chemical mechanism of the fixation of my guanylurea metallic complexes with or without the introduction of a sulfo group or groups is not entirely clear, there is a strong presumption that the metallic element of said complexes forms a link between the reactive group of the hide and the higher polymer forms of the guanylurea resin bases thus producing a strong bondage with the hide substance as evidenced by high shrink temperature and high water resistance.

In order to introduce a sulfo group to the stage A resin or amino-modified stage A resin, prior to forming the metallic complex, said resin is reacted with a water-soluble sulfo compound of the type illustrated by water-soluble metal salts of alkyl substituted sulfonates such as the alkanol sulfonates or alkyl-amine sulfonates, as well as compounds which when reacted with formaldehyde form alkanol amines wherein one hydrogen of said amine has been replaced by a sulfo group. Examples of these compounds are the sodium salt of hydroxy methane sulfonic acid (this compound may be prepared by reacting formaldehyde and sodium bisulfite), sodium isothionate, sodium salt of hydroxy propane sulfonic acid, sodium sulfamate, the sodium salt of hydroxy butane sulfonic acid, the sodium salt of high molecular weight alkanol sulfonic acid containing ether and ester radicals such as compounds having the formula

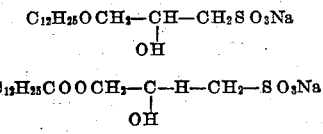

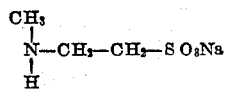

and sodium methyl tauride $$\underset{\text{H}}{\overset{\text{CH}_3}{\text{N}}}-\text{CH}_2-\text{CH}_2-\text{SO}_3\text{Na}$$

In place of the sodium salts, other water-soluble salts such as the potassium and ammonium salts may be used.

This reaction is generally carried out at a temperature in the range of 80° C. to 100° C., preferably 95° C., for a period of time in the range of 2 to 5 hours, preferably, 4 hours in the presence of water as a diluent. Lower temperatures may be employed, if so desired, which necessitates a longer reaction time. The amount of sulfo compound used, based on the amount of guanylurea used in forming the stage A resin, is generally in the range of 1 to 3 moles, preferably 1 mole per mole of guanylurea with the water being from ¼ to 4 times the amount of guanylurea.

The guanylurea metallic complexes of the present invention are particularly useful as direct tannages in forming leather of high shrink temperatures. Heavy hides as used for sole leather can be tanned with these complexes in 48 to 60 hours whereas ordinary vegetable tannage necessitates from 30 to 60 days.

The metal complexes of stage A, amino-modified stage A resins, as well as those resins having at least one sulfo group present, have the advantage of being quickly absorbed and fixed by the hide substance imparting at the same time a fullness and firmness not attainable by use alone of the presently known metallic salt tannages. Moreover, the aluminum guanylurea complexes are particularly desirable in that not only do they impart the above described properties to the hide but also impart to the hide a complete light resistance.

Advantageous, my novel metallic guanylurea complexes show outstanding properties when used in conjunction with vegetable extract tanned leather. Vegetable extract tanned leather has rather poor qualities in considering leaching out effects in the presence of water, as well as being subject to deterioration by bacteria and poor quality in presence of hot water. These leathers have considerably improved properties, however, if retanned with the metallic complexes of the present invention. As a general rule, such retanned leather withstands boiling water and after drying will show no brittleness, as well as maintaining its quality even though having been subjected to hot water. Leaching out effects are practically nil and bacteria attack is considerably reduced. Although the novel metallic complexes of my invention are extremely useful, the stage A resin and amino modified stage A resins are also valuable in the tanning field. Organic or inorganic salts of the free bases of stage A resin or modified stage A resin are useful on pickeled or unpickeled hides as pretanning agents followed by subsequent tannage with natural or synthetic tanning materials or metallic salts. These resins may be colloidally absorbed by the hide substance or interacted with anion-active high molecular weight products containing one or more sulfo groups as will later be described in detail in another aspect of my invention.

Also, my stage A and modified stage A resins are useful for retanning of leather as well as bleaching effects on leather tanned with metallic salts such as basic chromium sulfate or for hides tanned with vegetable or synthetic tanning materials.

As mentioned above, another important aspect of my invention is the use of my stage A and amino modified stage A resins in conjunction with anion-active high molecular weight compounds containing at least one sulfo group for bleaching, pretanning and retanning purposes. For the purpose of pretanning and retanning, the stage A resin or amino modified stage A resin can be prepared together with the anion-active high molecular weight sulfo compound by adjusting the pH so that no reaction occurs between the resin and sulfo compounds as will be later described in detail.

The retanning effect is obtained through direct absorbtion of the component mixture or through interreaction of the cation-active and anion-active components by lowering the pH values. Leather thus treated, and notably in combination with chrome tannages, has good fullness, smooth grain, softness and shows a remarkable even distribution of the resinous products through the hide substance. Consequently, leather of better yield is obtained which shows superior properties of chemical and physical stability.

In dispersing the cation-active stage A resin or modified stage A resin and anion-active high molecular weight sulfo compound on leather, the resin and sulfo compounds are preferably added to an aqueous bath under neutral or slightly alkaline conditions and are dispersed in the leather by means of said bath. It is necessary that the resin and sulfo compound be in a substantially neutral state when added to the bath to prevent a premature reaction of these components in the bath before they can be dispersed in the leather.

Thus, resins on the acid side, prior to the addition of the sulfo compound with the resin, are preferably treated with an alkaline base to a neutral or slightly alkaline state. If the sulfo compound is in the form of a neutral salt, the sulfo compound and stage A resin or amino modified stage A resin are put in an aqueous bath and the leather, tanned with metal tannages, such as basic chrome sulfate, is treated with said bath for a sufficient period of time, usually ½ to 4 hours, preferably 2 hours, at a temperature in the range of 30° C. to 50° C. until the sulfo compound and stage A resin or amino modified stage A resin have had time to be absorbed by the leather. Of course, either the resin or sulfo compound may be dispersed on the leather alternatively instead of simultaneously if so desired, but it is advantageous to treat the leather simultaneously for the time of treatment is shortened and procedure simplified. When both the neutral salt of the sulfo compound and the stage A resin or amino modified stage A resin have been absorbed by the leather, an acidic compound, such as sulfuric acid, acetic acid, formic acid, hydroxyacetic acid, citric acid, lactic acid, diglycolic acid, etc. or an acidic salt such as aluminum sulfate, aluminum chloride, sodium bisulfate is added to the bath to bring the pH of the bath to a definite acidic environment, for example, a pH of about 3 or 4, whereupon the sulfo compound and stage A resin or amino modified stage A resin react forming a water insoluble compound which remains fixed in the leather, which improves the tensile strength, flexability, resistance to cracking and resistance to abrasion of the treated leather.

When a sulfo compound is used which has a free sulfo group so as to be acidic in nature, the sulfo compound and stage A resin or amino modified stage A resin can not be added to the bath simultaneously since, due to the acidic nature of the sulfo compound, a reaction would take place immediately, whereby a water insoluble compound would be formed in the bath, and a sufficient amount of said compound would not be absorbed by the leather. Hence, when a sulfo compound having the sulfo group in the free state is used, the leather must be treated with either the sulfo compound or stage A resin or amino modified stage A resin first, and subsequently with the other, but not simultaneously.

The amount of sulfo compound used, based on the amount of guanylurea used in forming the stage A resin is generally in the range of 2 to 1 moles per mole of guanylurea.

Illustrative examples of sulfo compounds which may be used are lignin sulfonate and its neutral salts such as sodium sulfo lignin and magnesium sulfo lignin; vegetable tannins such as wattle extract solubilized by sodium bisulfite as well as quebracho extract solubilized by sodium bisulfite and the neutral water soluble salts of these extracts produced by neutralizing each of these extracts with a base such as sodium hydroxide, ammonium hydroxide and potassium hydroxide; synthetic tannins known as exchange tannins, having at least one sulfo radical. Included in these exchange tannins are both the acid tannins having a free sulfo group as well as the water-soluble salts such as the sodium salts.

The above exchange tannins, preferably include the tannins formed by joining two moles of compounds such as phenol, cresol, xylenol, naphthol, catechol, resorcinol, naphthalene, anthracene and benzidine with a methylene, sulfone, propane or sulfonimid bridge. At least one mole of the phenol, cresol etc. compounds contain a sulfo group. Illustrative examples of these compounds are: disulfo dinaphthol methane, disulfo dinaphthyl methane, monosulfo dihydroxy diphenyl methane, a complex reaction product formed by reacting monosulfo dihydroxy diphenyl methane with formaldehyde to give the formula:

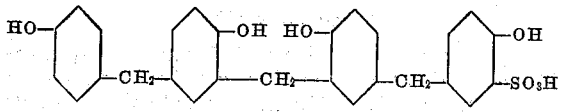

omega sulfonate of dihydroxy dimethyl diphenyl sulfone, and omega sulfonate of dihydroxy diphenyl sulfone, omega sulfonate of dihydroxy diphenyl propane, disulfo dihydroxy diphenyl propane, disulfo dihydroxy diphenyl sulfone, and complex compounds containing a benzidine radical with a sulfonimide-bridge as illustrated by the following compound:

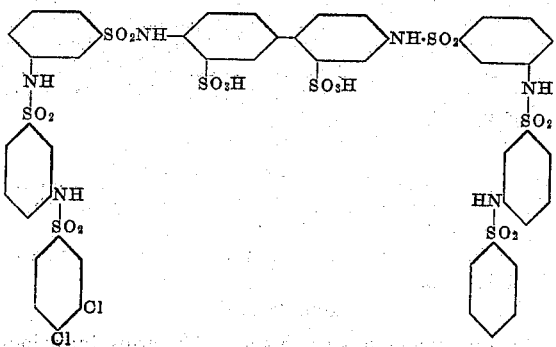

The water-soluble salts of these compounds are also operable such as the sodium, potassium and ammonium salts as illustrated by the sodium salt of disulfo dinaphthyl methane, the sodium salt of disulfo dihydroxy diphenyl propane and the sodium salt of disulfo dihydroxy diphenyl sulfone.

In order to illustrate by working examples the preparation of the resins of my invention the following specific examples are given hereinbelow. Examples 1 to 30 are directed to the preparations of the novel resins of the present invention while Examples 31 to 51 are directed to the application of my resins in the tanning industry.

*Example I*

300 grms. guanylurea sulfate, 324 grms. formaldehyde 37% and 300 cc. water are heated together under reflux for 3 hours at 95° C. The reaction product is then cooled down to 70° C. and 105 grms. basic aluminum acetate of the following formula

are then added and stirring continued at that temperature until a clear solution is obtained. Hides treated with this composition produce a leather having a shrink temperature of 95° C.

*Example II*

137 grms. guanylurea chloride, 324 grms. formaldehyde 37% and 300 cc. water are heated together under reflux for 3 hours at 95° C. The reaction product is then cooled down to 70° C. and 105 grms. basic aluminum acetate of the following formula

are then added and stirring continued at that temperature until a clear solution is obtained. Hides treated with this composition produce leather having a shrink temperature of 90° C.

*Example III*

146 grms. guanylurea borate, 324 grms. formaldehyde 37% and 150 cc. water are heated together under reflux for 3 hours at 95° C. The reaction product is then cooled down to 70° C. and 105 grms. basic aluminum acetate of the following formula

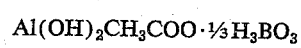

are then added and stirring continued at that temperature until a clear solution is obtained. Hides treated with this composition produce leather having a shrink temperature of 91° C.

EXAMPLE IV 164 grms. guanylurea acetate, 324 grms. formaldehyde 37% and 300 cc. water are heated together under reflux for 3 hours at 95° C. The reaction product is then cooled down to 70° C. and 105 grms. basic aluminum acetate of the following formula $Al(OH)_2CH_3COO \cdot \frac{1}{3}H_3BO_3$ are then added and stirring continued at that temperature until a clear solution is obtained. Hides treated with this composition produce leather having a shrink temperature of 91° C.

EXAMPLE V 146 grms. guanylurea borate, 120 grms. water and 1,000 grms. of 35% solution of the sodium salt of disulfo dinaphthyl methane are put in a reflux condenser and 324 grms. of formaldehyde 37% are added. This mixture is heated and refluxed for 4 hours at 95° C. to 100° C. 164 grms. guanylurea borate and 120 grms. water are then added and the mixture is refluxed at 95° C. to 100° C. for 3 hours to produce a resulting reaction product which is stable in liquid form and can be dried in the usual ways.

EXAMPLE VI 146 grms. guanylurea borate, 120 grms. water and 324 grms. formaldehyde 37% are put in a reflux condenser and refluxed at 95° C. to 100° C. for 4 hours. 164 grms. guanylurea borate and 120 grms. water are then added and the mixture is heated for 3 hours at 95° C. Next, 324 grms. formaldehyde 37% are then added and the mixture is then refluxed for 3 hours at 95° C. to produce a guanylurea resin of which a 5% water solution has a pH of 7.85.

EXAMPLE VII 300 grms. guanylurea sulphate are condensed with 324 grms. of formaldehyde 37% for 4 hours at 95° C. to 100° C. in a reflux condenser. 300 grms. of guanylurea sulphate are then introduced and the mixture is refluxed for 3 hours at 95° C. A white slurry is formed as the reaction product. 300 cc. of water are introduced and 324 grms. of formaldehyde 37% are then added. Heating is continued at 95° C. for 3 hours to produce a clear liquid reaction product of which a 5% solution has a pH of 5.3.

EXAMPLE VIII 200 grms. guanylurea phosphate and 324 grms. formaldehyde 37% are condensed under reflux for 4 hours at 95° C. to 100° C. The reaction product is cooled down to 70° C. and 180 grms. of guanidine carbonate are added and the mixture is heated at 95° C. to 100° C. for 3 hours to produce a guanylurea resin of which a 5% solution has a pH of 7.5.

EXAMPLE IX 300 grms. guanylurea sulphate and 648 grms. formaldehyde 37% are condensed in a reflux condenser for 6 hours at 95° C. to 100° C. 300 grms. of guanylurea sulphate are then added and the mixture is heated for 3 hours at 95° C. The reaction product is then cooled down to 40° C. and neutralized slowly with 345 grms. of ammonium hydroxide 28% to produce a guanylurea resin of which a 5% solution has a pH of 8.5. 800 grms. of a 35% water solution of the sodium salt of disulfo dinaphthyl methane are added under strong stirring until a uniform liquid was formed and the total reaction product being completely water soluble.

EXAMPLE X 300 grms. guanylurea sulphate and 648 grms. formaldehyde 37% are condensed in a reflux condenser for 6 hours at 95° C. to 100° C. 300 grms. of guanylurea sulphate are then added and the mixture is heated for 3 hours at 95° C. The reaction product is then cooled down to 40° C. and neutralized slowly with 246 grms. of sodium hydroxide 40° Bé. to produce a guanylurea resin of which a 5% solution has a pH of 9.4. 1,000 grms. of a 35% water solution of the sodium salt of disulfo dinaphthyl methane are added under strong stirring until a uniform liquid was formed and the total reaction product being completely water soluble.

EXAMPLE XI 300 grms. guanylurea sulphate, 324 grms. formaldehyde 37% and 300 cc. water are put in a reflux condenser. The mixture is heated to 95° C. to 100° C. for 4 hours. The reaction product is then cooled down to 80° C. Then 105 grms. of basic aluminum acetate are added. Hides treated with this composition produce leather having a shrink temperature of 94° C.

EXAMPLE XII 300 grms. guanylurea sulphate and 324 grms. formaldehyde 37% are heated and refluxed at 95° C. to 100° C. 100 cc. of water are added. 148 grms. sodium isothionate are put into the flask and heating continued at 95° C. to 100° C. for 4 hours. 105 grms. basic aluminum acetate and 100 cc. of water are added and heated to 95° to 100° C. for further 3 hours. Hides treated with this composition produce a leather having a shrink temperature of 87° C.

EXAMPLE XIII 300 grms. guanylurea sulphate and 324 grms. formaldehyde 37% are heated under reflux for 4 hours at 95° C. to 100° C. 104 grms. sodium bisulphite and 162 grms. formaldehyde 37% are reacted together and added to the guanylurea reaction product. The mixture is then heated to 95° C. to 100° C. and refluxed for 3 hours. The product is cooled down to 80° C. and 105 grms. basic aluminum acetate are added. This mixture is heated at 95° C. for 2 hours. Hides treated with this composition produce leather having a shrink temperature of 91° C.

EXAMPLE XIV 300 grms. guanylurea sulphate and 324 grms. formaldehyde 37% are heated and refluxed at 95° C. to 100° C. 293 grms. of a water solution of sodium sulfamate containing 109 grms. of this salt are added. Heat is brought to 95° to 100° C. and continued at this temperature for 3 hours. The reaction product is cooled to 80° C. and 105 grms. basic aluminum acetate are then added and stirring applied until a clear solution is obtained. Hides treated with this composition produce leather having a shrink temperature of 85° C.

EXAMPLE XV 300 grms. guanylurea sulphate and 324 grms. formaldehyde 37% are heated and refluxed at 95° C. to 100° C. 300 grms. guanylurea sulphate are added and the mixture is heated for 3 hours at 95° C. A white slurry-like product is formed. 300 cc. of water and 300 cc. of formaldehyde 37% are added and the mixture is heated and refluxed at 95° C. for 3 hours whereupon a clear solution is formed. 420 grms. of basic aluminum acetate are then added and stirring is applied until a clear product is obtained. Hides treated with this composition produce a leather having a shrink temperature of 96° C.

Example XVI 164 grms. guanylurea borate, 120 cc. water and 324 grms. formaldehyde 37% are heated and refluxed at 95° C. to 100° C. for 4 hours. 164 grms. guanylurea borate and 120 cc. water are then added and heating is continued at 95° C. to 100° C. for 3 hours. 324 grms. formaldehyde 37% are introduced and the reaction completed by refluxing for 3 hours at 95° C. 210 grms. of basic aluminum acetate are then stirred in and product heated at 95° C. until clear solution is obtained. Hides treated with this composition produce a leather having a shrink temperature of 96° C.

Example XVII 300 grms. guanylurea sulphate, 243 grms. formaldehyde 37% and 75 cc. of water are heated and refluxed 4 hours at 95° C. to 100° C. 105 grms. basic aluminum acetate are then introduced and stirring continued until a clear solution is obtained. Hides treated with this composition produce a leather having a shrink temperature of 97° C.

Example XVIII 300 grms. guanylurea sulphate, 60 grms. urea and 486 grms. formaldehyde 37% are heated and refluxed for 4 hours at 95° C. to 100° C. 105 grms. basic aluminum acetate are then introduced. The reaction mixture is heated at 80° C. for 2 hours. Hides treated with this composition produce a leather having a shrink temperature of 93° C.

Example XIX 900 grms. of reaction product as obtained in Example VII are heated with 361 grms. of basic chrome sulphate powder at 95° C. to 100° C. Hides tanned with this composition produce a leather having a shrink temperature of 100° C.

Example XX 150 grms. guanylurea sulphate and 324 grms. formaldehyde 37% are heated and refluxed at 95° C. to 100° C. for 3 hours. 71 grms. diacetylene urea powder are added and heating continued at 95° C. to 100° C. for 3 hours. 105 grms. of basic aluminum acetate and 100 cc. of water are added. The reaction product is cooled to 80° C. and stirring continued until a clear solution is obtained. Hides tanned with this composition produce a leather having a shrink temperature of 96° C.

*Example XXI*

300 grms. guanylurea sulphate and 648 grms. formaldehyde 37% are heated and refluxed at 95° C. to 100° C. for 4 hours. 210 grms. of basic aluminum acetate are then stirred in and heating continued for 1 hour until a clear solution is formed. Hides tanned with this composition produce a leather having a shrink temperature of 96° C.

*Example XXII*

300 grms. guanylurea sulphate and 486 grms. of formaldehyde 37% are heated and refluxed at 95° C. to 100° C. for 4 hours. 210 grms. basic aluminum acetate are then added and product heated until clear solution is obtained. Hides tanned with this composition produce a leather having a shrink temperature of 98° C.

*Example XXIII*

150 grms. guanylurea sulphate and 324 grms. formaldehyde 37% are heated and refluxed at 95° C. to 100° C. for 4 hours. 150 grms. guanylurea sulphate are then added and refluxing at 95° C. to 100° C. continued for 3 hours. 324 grms. formaldehyde 37% are then introduced and heated at 95° C. to 100° C. under reflux continued for 3 hours. 210 grms. of basic aluminum acetate are introduced and the heating continued until solution gets clear. Hides tanned with this composition produce a leather having a shrink temperature of 97° C.

*Example XXIV*

150 grms. guanylurea sulphate and 324 grms. formaldehyde 37% are heated and refluxed 3 hours at 95° C. to 100° C. 58 grms. aluminum hydrate powder are added under stirring and 76.5 grms. formic acid 90% and 15.0 grms. boric acid powder are introduced. The product is heated until clear solution is obtained. Hides tanned with this composition have a shrink temperature of 90° C.

*Example XXV*

150 grms. guanylurea sulphate and 324 grms. formaldehyde 37% are heated and refluxed at 95° C. to 100° C. for 4 hours. 104 grms. sodium bisulphite and 81 grms. formaldehyde 37% are reacted and the reaction product is added to the guanylurea sulphate formaldehyde condensation product. This mixture is heated and refluxed for 4 hours at 95° C. to 100° C. 100 cc. of water and 140 grms. basic aluminum acetate are added and heating and stirring continued until dissolved. Hides tanned with this composition produce a leather having a shrink temperature of 97° C.

*Example XXVI*

300 grms. guanylurea sulphate and 648 grms. formaldehyde 37% are heated under reflux at 95° C. to 100° C. for 4 hours. To this reaction product 300 grms. guanylurea sulphate are added and heating is continued for 4 hours at 95° C. to 100° C. 648 grms. formaldehyde 37% are then added and the mixture is heated for another period of 4 hours. 416 grms. sodium bisulphite and 324 grms. formaldehyde 37% are reacted, and the reaction product is then introduced into the above mentioned condensation product and the mixture is then heated at 95° C. to 100° C. for 4 hours. 400 grms. water and 560 grms. basic aluminum acetate are then introduced under strong stirring until dissolved. Hides tanned with this composition produce a leather having a shrink temperature of 97.5° C.

*Example XXVII*

300 grms. guanylurea sulphate and 648 grms. formaldehyde 37% are heated under reflux at 95° C. to 100° C. for 4 hours. To this reaction product 300 grms. guanylurea sulphate are added and the heating continued for 4 hours at 95° C. to 100° C. 648 grms. formaldehyde 37% are then added and heating is continued further for another period of 4 hours. 388 grms. sulfamic acid are dissolved in 400 grms. water and neutralized with 384 grms. of caustic soda 40° Bé. This solution of sodium sulfamate is added to the above mentioned reaction compound and heating applied for 4 hours at 95° C. to 100° C. 560 grms. basic aluminum acetate and 400 cc. water are added under strong stirring until dissolved. Hides tanned by this composition produce a leather having a shrink temperature of 93.5° C.

*Example XXVIII*

150 grms. guanylurea sulphate and 324 grms. formaldehyde 37% are heated and refluxed for 4 hours at 95° C. to 100° C. 84 grms. dicyandiamide are added and heating at 95° C. to 100° C. proceeded for 4 hours. 182 grms. of formaldehyde 37% are then introduced and the condensation product is heated 4 hours at 95° C. to 100° C. 200 grms. water and 205 grms. basic aluminum acetate are then added under strong stirring. Hides tanned with this composition produce a leather having a shrink temperature of 99° C.

*Example XXIX*

300 grms. guanylurea sulphate and 648 grms. formaldehyde 37% are heated under reflux at 95° C. to 100° C. for 4 hours. To this reaction product 300 grms. guanylurea sulphate are added and heating is continued for 4 hours at 95° C. to 100° C. 648 grms. formaldehyde 37% are then added and heating further for another period of 4 hours. 592 grms. sodium isothionate are added and heating applied for 4 hours at 95° C. to 100° C. 560 grms. basic aluminum acetate and 400 cc. of water are added to the reaction product under strong stirring until dissolved. Hides tanned with this composition produce a leather having a shrink temperature of 95.5° C.

*Example XXX*

150 grms. guanylurea sulphate and 324 grms. formaldehyde 37% are heated and refluxed for 4 hours at 95° C. to 100° C. The reaction product of 104 grms. sodium bisulphite and 81 grms. formaldehyde 37% are added and heated for 4 hours at 95° C. to 100° C. 78 grms. aluminum hydrate powder is introduced under strong stirring until finely dispersed. 72 grms. glacial acetic acid 99%, 20 grms. boric acid powder and 100 grms. water are then introduced. The mixture is heated for 1 hour at 100° C. at which time a clear solution was obtained. Hides tanned with this composition produce a leather having a shrink temperature of 95.5° C.

The next 4 examples illustrate the use of some of the present compositions as white tannages.

*Example XXXI*

100 pounds of pickled calfskin stock are added to a water bath in a tumbler, said water bath containing 70 pounds salt water, 3% solution, 40 pounds of a stage A resin-metal complex prepared in accordance with Example I, and 3 pounds of sodium acetate. The stock is run in the bath for 8 hours. 30 pounds of water and 4 pounds of borax are added to adjust the bath to the desired pH. The stock is then run in the bath for 6 hours and is then horsed up and washed. The leather produced in accordance with this example has a shrink temperature of 95° C.

*Example XXXII*

100 pounds of pickled calfskin stock are added to a water bath in a tumbler, said water bath containing 70 pounds salt water, 3% solution, 40 pounds of an amino modified stage A resin-metal complex prepared in accordance with Example XXIII, and 3 pounds of sodium acetate. The stock is run in the bath for 8 hours. 30 pounds of water and 4 pounds of borax are added to adjust the bath to the desired pH. The stock is then run in the bath for 6 hours and is then horsed up and washed. The leather produced in accordance with this example has a shrink temperature of 97° C.

*Example XXXIII*

100 pounds of pickled calfskin stock are added to a water bath in a tumbler, said water bath containing 70 pounds salt water, 3% solution, 40 pounds of a sulfo compound containing an amino modified stage A resin-metal complex prepared in accordance with Example XXVI, and 3 pounds of sodium acetate. The stock is run in the bath for 8 hours. 30 pounds of water and 4 pounds of borax are added to adjust the bath to the desired pH. The stock is then run in the bath for 6 hours and is then horsed up and washed. The leather produced in accordance with the example has a shrink temperature of 97.5° C.

*Example XXXIV*

100 pounds of pickled calfskin stock are added to a water bath in a tumbler, said water bath containing 70 pounds salt water, 3% solution, 40 pounds of a sulfo group containing stage A resin-metal complex prepared in accordance with Example XXX, and 3 pounds of sodium acetate. The stock is run in the bath for 8 hours. 30 pounds of water and 4 pounds of borax are added to adjust the bath to the desired pH. The stock is then run in the bath for 6 hours and is then horsed up and washed. The leather produced in accordance with this example has a shink temperature of 95.5° C.

The next 4 examples illustrate the use of some of the compositions of the present invention as light-proof white tannages.

*Example XXXV*

100 pounds of pickled calfskin are added to a water bath containing 70 pounds of a 3% salt solution at 30° C., 30 lbs. of a stage A resin-metal complex prepared in accordance with Example I, and 2 pounds potassium chrome alum and the stock is run in the bath for 15 hours. 4 pounds of borax are added to adjust the pH of the bath and the stock is then run in the bath for 6 hours. The stock is then horsed up for 24 hours and then washed an fat liquored. The leather produced in accordance with this example has a shrink temperature of 95° C.

*Example XXXVI*

100 pounds of pickled calfskin are added to a water bath containing 70 pounds of a 3% salt solution at 30° C., 30 lbs. of an amino modified stage A resin-metal complex prepared in accordance with Example XXIII, and 2 pounds potassium chrome alum and the stock is run in the bath for 15 hours. 4 pounds of borax are added to adjust the pH of the bath and the stock is then run in the bath for 6 hours. The stock is then horsed up to 24 hours and then washed and fat liquored. The leather produced in accordance with this example has a shrink temperature of 97° C.

*Example XXXVII*

100 pounds of pickled calfskin are added to a water bath containing 70 pounds of a 3% salt solution at 30° C., 30 lbs. of a sulfo group containing an amino modified stage A resin-metal complex prepared in accordance with Example XXVI, and 2 pounds potassium chrome alum and the stock is run in the bath for 15 hours. 4 pounds of borax are added to adjust the pH of the bath and the stock is then horsed up for 24 hours and then washed and fat liquored. The leather produced in accordance with this example has a shrink temperature of 97.5° C.

*Example XXXVIII*

100 pounds of pickled calfskin are added to a water bath containing 70 pounds of a 3% salt solution at 30° C., 30 lbs. of a sulfo group containing stage A resin-metal complex prepared in accordance with Example XXX, and 2 pounds potassium chrome alum and the stock is run in the bath for 15 hours. 4 pounds of borax are added to adjust the pH of the bath and the stock is then run in the bath for 6 hours. The stock is then horsed up for 24 hours and then washed and fat liquored. The leather produced in accordance with this example has a shrink temperature of 95.5° C.

The next example illustrates the use of a composition of the present invention as a pretanning agent for chrome tannages.

*Example XXXIX*

100 pounds of pickled calfskin stock are added to a water bath in a tumbler, said water bath containing 100 pounds of salt water, 3% solution and 20 pounds of an amino modified-stage A resin prepared in accordance with Example VI. The stock is then run in the bath for 4 hours. To the bath is then added 3 pounds of the sodium salt of disulfo dinaphthyl methane and 50 pounds of water, after which the stock is run in the bath for 2 hours and the bath is then drained. 100 pounds of water and 8 pounds of a basic chrome sulphate are then added to the tumbler and the stock is run in this bath for 5 hours. Bicarbonate of soda is then added until the pH is 5, after which the stock is run in the bath for 2 hours. The stock is then horsed up and washed.

The next 2 examples illustrate another pretanning composition.

*Example XL*

100 pounds of pickled goatskin stock are added to a water bath in a tumbler, said water bath containing 12 gallons salt water (¼ lb. of salt to the gallon), and 1.5 pounds of bicarbonate of soda. The stock is run in the bath for ½ hour and the pH is checked and adjusted as necessary so as to be between 5.5 and 6. The liquid is then drained from the tumbler and 12 gallons of salt water (⅛ pound of salt to the gallon), and 17.5 pounds of an amino modified stage A resin containing anion-active neutral salts of higher sulphonates prepared in accordance with Example V are added and the stock is run in this bath for 1 hour. One pound of sulfuric acid and 20 pounds of water are then added and the stock is run in this bath for ¼ hour. This bath is then drained from the tumbler and the stock is then tanned with the usual amount of salt water and a chrome tanning salt.

*Example XLI*

100 pounds of pickled goatskin stock are added to a water bath in a tumbler, said water bath containing 12 gallons salt water (¼ lb. of salt to the gallon), and 1.5 pounds of bicarbonate of soda. The stock is run in the bath for ½ hour and the pH is checked and adjusted as necessary so as to be between 5.5 and 6. The liquid is then drained from the tumbler and 12 gallons of salt water (⅛ pound of salt to the gallon), and 17.5 pounds of a stage A resin containing anion-active neutral salts of higher sulphonates prepared in accordance with Example IX are added and the stock is run in this bath for 1 hour. One pound of sulfuric acid and 20 pounds of water are then added and the stock is run in this bath for ¼ hour. This bath is then drained from the tumbler and the stock is then tanned with the usual amount of salt water and a chrome tanning salt.

The next 2 examples illustrate the use of compositions of the present invention as retanning agents for chrome tanned goatskin.

*Example XLII*

100 pounds of chrome tanned goatskin are washed in the tumbler for ¼ hour and the washing solution is then drained. To the tumbler is added 20 pounds of an amino modified stage A resin containing anion-active neutral salts of higher sulphonates prepared in accordance with Example V and 60 pounds of water at 50° C. The tanned skins are then run in the bath for 2 hours. Next, ½ pound of sulfuric acid 60° Bé. and 20 pounds of cold water are added to the bath and the stock is then run in the bath for ½ hour and then washed for ½ hour.

*Example XLIII*

100 pounds of chrome tanned goatskin are washed in the tumbler for ¼ hour and the washing solution is then drained. To the tumbler is added 20 pounds of a stage A resin containing anion-active neutral salts of higher sulphonates prepared in accordance with Example IX and 60 pounds of water at 50° C. The tanned skins are then run in the bath for 2 hours. Next, ½ pound of sulfuric acid 60° Bé. and 20 pounds of cold water are added to the bath and the stock is then run in the bath for ½ hour and then washed for ½ hour.

The next example illustrates the use of a composition of the present invention as a bleach for chrome tanned skins.

*Example XLIV*

100 pounds of chrome tanned calfskins are neutralized and washed in a drum. The drum is then drained and there is added 10 pounds of an amino modified stage A resin prepared in accordance with Example VII and 100 pounds of water at 40° C. The stock is run in the bath for 2 hours. Next, 3 pounds of the sodium salt of disulfo dinaphthyl methane and 30 pounds of water at 40° C. are added to the bath and the stock is run in the bath for ½ hour, after which the skins are washed.

The next 3 examples illustrate the use of compositions of the present invention on hides or skins tanned with oak, chestnut, quebracho, wattle or any type of vegetable extract, to produce a shrink temperature of 100° C.

*Example XLV*

100 pounds of vegetable extract tanned leather are put into a drum. There are then added 20 pounds of an amino modified stage A resin prepared in accordance with Example VI and 250 pounds of water at 30° C., sufficient to give the hides or skins a good float. Heavy hides or skins remain in this tanning bath 36 hours while light-weight skins remain 24 hours. After tanning, the skins are horsed up for 24 hours and then washed and fat liquored. Leather tanned in accordance with this example has a shrink temperature of 100° C.

*Example XLVI*

100 pounds of vegetable extract tanned leather are put into a drum. There are then added 20 pounds of a stage A resin-metal complex prepared in accordance with Example II and 250 pounds of water at 30° C., sufficient to give the hides or skins a good float. Heavy hides or skins remain in this tanning bath 36 hours while light-weight skins remain 24 hours. After tanning, the skins are horsed up for 24 hours and then washed and fat liquored. Leather tanned in accordance with this example has a shrink temperature of 100° C.

*Example XLVII*

100 pounds of vegetable extract tanned leather are put into a drum. There are then added 20 pounds of a sulfo group containing amino modified stage A resin-metal complex prepared in accordance with Example XXVI and 250 pounds of water at 30° C., sufficient to give the hides or skins a good float. Heavy hides or skins remain in this tanning bath 36 hours while light-weight skins remain 24 hours. After tanning, the skins are horsed up for 24 hours and then washed and fat liquored. Leather tanned in accordance with this example has a shrink temperature of 100° C.

The next 4 examples illustrate the use of producing a special type of tannages on heavy hides.

*Example XLVIII*

100 pounds of drained flesh-weight hides are put into a drum and delined with a bath containing 4 pounds of borax, 1 pound sulphuric acid and 300 pounds of water at 25° C., the hides being run in the bath for 1 hour and then washed for 1 hour. To this bath are added 10 gallons of salt water 25° C. (¼ pound salt to the gallon), 2 pounds magnesium sulphate, 2 pounds sodium acetate and 35 pounds of a stage A resin-metal complex prepared in accordance with Example I. The hides are run in the bath for 4 hours. Next, 35 pounds of a stage A resin-metal complex prepared in accordance with Example I are put in a bath and the hides are run in the bath for 15 hours. Next, 3 pounds of borax and 40 pounds of water at 25° C. are added to the bath and the stock is run in the bath for 24 hours, said bath being adjusted to a pH around 5.7. The hides are then horsed up and then washed and fat liquored. The leather produced in accordance with this example has a shrink temperature of 95° C.

*Example XLIX*

100 pounds of drained flesh-weight hides are put into a drum and delined with a bath containing 4 pounds of borax, 1 pound sulphuric acid and 300 pounds of water at 25° C., the hides being run in the bath for 1 hour and then washed for 1 hour. To this bath are added 10 gallons of salt water 25° C. (¼ pound salt to the gallon), 2 pounds magnesium sulphate, 2 pounds sodium acetate and 35 pounds of an amino modified stage A resin-metal complex prepared in accordance with Example XXIII. The hides are run in the bath for 4 hours. Next, 35 pounds of an amino modified stage A resin-metal complex prepared in accordance with Example XXIII are put in a bath and the hides are run in the bath for 15 hours. Next, 3 pounds of borax and 40 pounds of water at 25° C. are added to the bath and the stock is run in the bath for 24 hours, said bath being adjusted to a pH around 5.7. The hides are then horsed up and then washed and fat liquored. The leather produced in accordance with this example has a shrink temperature of 97° C.

*Example L*

100 pounds of drained flesh-weight hides are put into a drum and delined with a bath containing 4 pounds of borax, 1 pound sulphuric acid and 300 pounds of water at 25° C., the hides being run in the bath for 1 hour and then washed for 1 hour. To this bath are added 10 gallons of salt water 25° C. (¼ pound salt to the gallon), 2 pounds magnesium sulphate, 2 pounds sodium acetate and 35 pounds of a sulfo compound containing an amino modified stage A resin-metal complex prepared in accordance with Example XXVI. The hides are run in the bath for 4 hours. Next, 35 pounds of a sulfo compound containing an amino modified stage A resin-metal complex prepared in accordance with Example XXVI are put in a bath and the hides are run in the bath for 15 hours. Next, 3 pounds of borax and 40 pounds of water at 25° C. are added to the bath and the stock is run in the bath for 24 hours, said bath being adjusted to a pH around 5.7. The hides are then horsed up and then washed and fat liquored. The leather produced in accordance with this example has a shrink temperature of 97.5° C.

*Example LI*

100 pounds of drained flesh-weight hides are put into a drum and delined with a bath containing 4 pounds of borax, 1 pound sulphuric acid and 300 pounds of water at 25° C., the hides being run in the bath for 1 hour and then washed for 1 hour. To this bath are added 10 gallons of salt water 25° C. (¼ pound salt to the gallon), 2 pounds magnesium sulphate, 2 pounds sodium acetate and 35 pounds of a sulfo group containing stage A resin-metal complex prepared in accordance with Example XXX. The hides are run in the bath for 4 hours. Next, 35 pounds of a sulfo group containing stage A resin-metal complex prepared in accordance with Example XXX are put in a bath and the hides are run in the bath for 15 hours. Next, 3 pounds of borax and 40 pounds of water at 25° C. are added to the bath and the stock is run in the bath for 24 hours, said bath being adjusted to a pH around 5. 7. The hides are then horsed up and then washed and fat liquored. The leather produced in accordance with this example has a shrink temperature of 95.5° C.

It should be understood that the term "water dispersible as used in the claims means soluble in water or capable of existing as a colloidal suspension in aqueous medium.

The invention in its broader aspects is not limited to the specific compositions, combinations and improvements, processes and steps described but departures may be made therefrom within the scope of the accompanying claims without departing from the principles of the invention and without sacrificing its chief advantages.

I claim:

1. A process for the production of water dispersible cation-active guanylurea resin compositions comprising reacting guanylurea with formaldehyde in the presence of water in a first stage reaction, the proportion of formaldehyde being in the range of 1.5 to 6.0 moles per mole of guanylurea to form a water soluble reaction product and, in a second stage reaction, reacting the water soluble reaction product of the first stage with a salt selected from the group consisting of basic aluminum acetate, an aluminum acetate having the formula $$Al(OH)_2(CH_3COO) \cdot \tfrac{1}{3} H_3BO_3$$

aluminum formo acetate having the formula $$Al(OH)(OOCH)(OOCCH_3)$$

aluminum formate, basic chrome sulfate, chrome sulfate, chrome alum $(Cr_2(SO_4)_3K_2SO_4.12H_{20})$, zirconium sulfate, basic zirconium sulfate, zirconium chloride, basic zirconium chloride, zirconium acetate, copper acetate, copper sulfate, copper chloride, iron formate, iron sulfate, iron gluconate, iron chloride, zinc acetate, zinc chloride and zinc formate, the amount of metal salt based on the amount of guanylurea used in the first stage being at least one quarter mole per mole of guanylurea.

2. A process according to claim 1 wherein the resulting product of the first stage is reacted with a sulfo-containing compound prior to the second stage reaction, said sulfo compound being selected from the group consisting of the water soluble salts of hydroxy methane sulfonic acid, water soluble salts of hydroxy propane sulfonic acid, water soluble sulfamates, water soluble salts of hydroxy butane sulfonic acid, water soluble methyl taurides, water soluble salts of high molecular weight sulfonic acids having the formulae

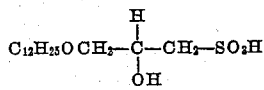

and

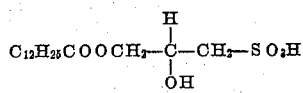

the amount of sulfo compound being in the range of about one to about three moles per mole of guanylurea used in forming the first stage reaction product.

3. A process as defined in claim 1, wherein the resulting product of stage 1 prior to the second stage reaction, is reacted with an amine selected from the group consisting of urea, guanylurea, guanidine, dicyanodiamide, guanyl thiourea, melamine, ammeline, ammelede and diacetylene urea, the amount of said amine being in the range of one-third to one mole per mole of guanylurea used in forming the first stage reaction product.

4. A process as defined in claim 3 wherein the resulting product of stage 1, subsequent to its reaction with said amine but prior to the second stage reaction, is reacted with formaldehyde, the amount of formaldehyde being in the range of 1½ to 4 moles per mole of guanylurea used in forming the first stage reaction product.

5. A process for the preparation of guanylurea resins for use in the tanning industry comprising reacting guanylurea with formaldehyde to form a water soluble first stage reaction product, said reaction product having been prepared by reacting from 1.5 to 6.0 moles of formaldehyde with 1 mole of guanylurea, and then reacting said reaction product with an amine selected from the group consisting of urea, guanylurea, guanidine, dicyanodiamide, guanyl thiourea, melamine, ammeline, ammelede and diacetylene urea to form an amino modified guanylurea-formaldehyde resin, the amout of said amine compound being in the range of one-third to one mole per mole of guanylurea used in forming the first stage reaction product.

6. A process according to claim 5 wherein the resulting product of the reaction of guanylurea-formaldehyde first stage resin and said amine is reacted with formaldehyde.

7. A process for the preparation of a composition adapted for use in the tanning industry comprising mixing in an aqueous bath under neutral conditions a water dispersible cation-active guanylurea-formaldehyde condensation product, formed by reacting from 1.5 to 6.0 moles of formaldehyde per mole of guanylurea, and an anionic-active high molecular weight exchange tannin containing at least one sulfo group selected from the group consisting of disulfo dinaphthol methane, disulfo dinaphthyl methane, monosulfo dihydroxy diphenyl methane, omega sulfonate of dihydroxy dimethyl diphenyl sulfone, omega sulfonate of dihydroxy diphenyl sulfone, omega sulfonate of dihydroxy diphenyl propane, disulfo dihydroxy diphenyl sulfone, a compound having the formula

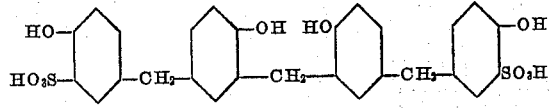

a compound having the formula

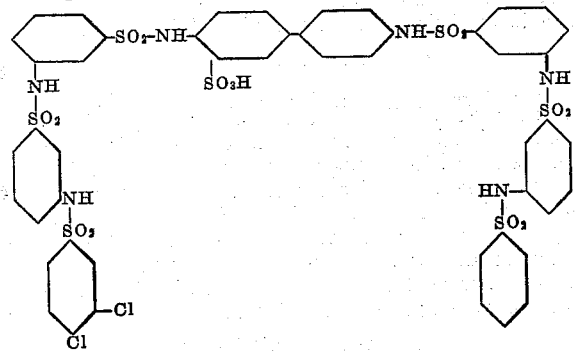

and the water soluble salts of the foregoing, said exchange tannin being in the range of one to two moles per mole of guanylurea used in forming said condensation product.

8. A process as defined in claim 7 wherein the cation-active guanylurea-formaldehyde condensation product has been further modified by formaldehyde prior to its addition to the bath, the amount of formaldehyde being in the range of 1½ to 4 moles per mole of guanylurea used in forming the first stage reaction product.

9. A process according to claim 7 wherein said water dispersible cation-active guanylurea formaldehyde condensation product, prior to being mixed with said anion active high molecular weight exchange tannin, is reacted with an amine selected from the group consisting of urea, guanylurea, guanidine, dicyanodiamide, guanyl thiourea, melamine, ammeline, ammelede and diacetylene urea, the amount of said amine being in the range of one-third to one mole per mole of guanylurea used in forming the first stage reaction product.

10. A process according to claim 9 wherein said water dispersible cation-active guanylurea formaldehyde condensation product, after it has been modified with said amine but prior to being mixed with said anion-active high molecular weight exchange tannin, is reacted with a sulfo compound selected from the group consisting of the water soluble salts of hydroxy methane sulfonic acid, water soluble salts of hydroxy propane, sulfonic acid, water soluble sulfamates, water soluble salts of hydroxy butane sulfonic acid, water soluble methyl taurides, water soluble salts of high molecular weight sulfonic acids having the formula

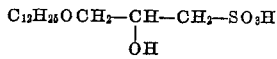

and

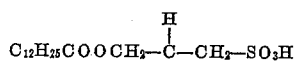

the amount of sulfo compound, based on the amount of guanylurea used in the first stage, being in the range of about one to about 3 moles per mole of guanylurea.

11. A process for the treatment of a penetrable object comprising placing said object in an aqueous bath under neutral conditions, said aqueous bath comprising a guanylurea-water soluble or dispersible guanylurea-formaldehyde condensation product, formed by the reaction of 1.5 to 6.0 moles of formaldehyde per mole of guanylurea, and an anion-active high molecular weight exchange tannin containing at least one sulfo group selected from the group consisting of disulfo dinaphthol methane, disulfo dinaphthyl methane, monosulfo dihydroxy diphenyl methane, omega sulfonate of dihydroxy dimethyl diphenyl sulfone, omega sulfonate of dihydroxy diphenyl sulfone, omega sulfonate of dihydroxy diphenyl propane, disulfo dihydroxy diphenyl propane, disulfo dihydroxy diphenyl sulfone, a compound having the formula

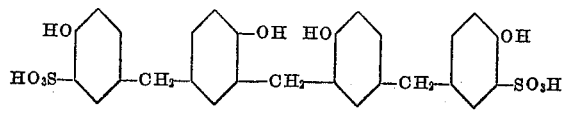

a compound having the formula

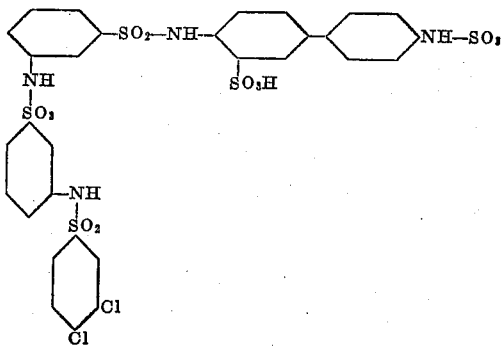

and the water soluble salts of the foregoing, said exchange tannin being in the range of one to two moles per mole of guanylurea used in forming said condensation product.

12. A process for the production of water dispersible guanylurea resins for use in the tanning industry comprising reacting guanylurea with formaldehyde in a first stage reaction, the amount of formaldehyde being in the range of 1.5 to 6 moles per mole of guanylurea, and then reacting this water soluble reaction product with a sulfo containing compound consisting of the water soluble salts of hydroxy methane sulfonic acid, water soluble salts of hydroxy propane sulfonic acid, water soluble sulfamates, water soluble salts of hydroxy butane sulfonic acid, water soluble methyl taurides, water soluble salts of high molecular weight sulfonic acids having the formulae

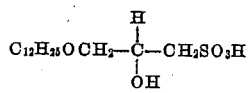

and

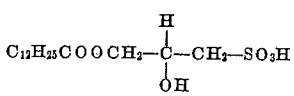

the amount of the sulfo compound, based on the amount of guanylurea used in the first stage, being in the range of about one to about 3 moles per mole of guanylurea.

13. A composition prepared in accordance with the process of claim 1.

14. A composition prepared in accordance with the process of claim 2.

15. A composition prepared in accordance with the process of claim 3.

16. A composition prepared in accordance with the process of claim 5.

17. A composition prepared in accordance with the process of claim 6.

18. A composition prepared in accordance with the process of claim 7.

19. An object treated in accordance with the process of claim 11.

20. A composition prepared in accordance with the process of claim 12.

References Cited in the file of this patent
UNITED STATES PATENTS

| | | |
|---|---|---|
| 2,145,011 | Landolt | Jan. 24, 1939 |
| 2,377,867 | D'Alelio | June 12, 1945 |
| 2,412,855 | Auten | Dec. 17, 1946 |
| 2,423,185 | Gundel | July 1, 1947 |
| 2,637,622 | Dawson | May 5, 1953 |